W. W. SYKES.
LOCOMOTIVE ASH PAN.
APPLICATION FILED JAN. 17, 1910.
962,269.
Patented June 21, 1910.
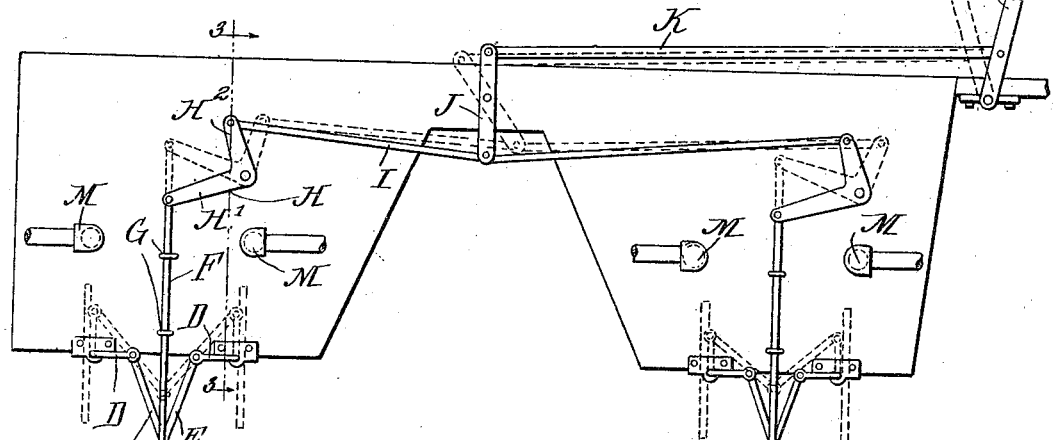
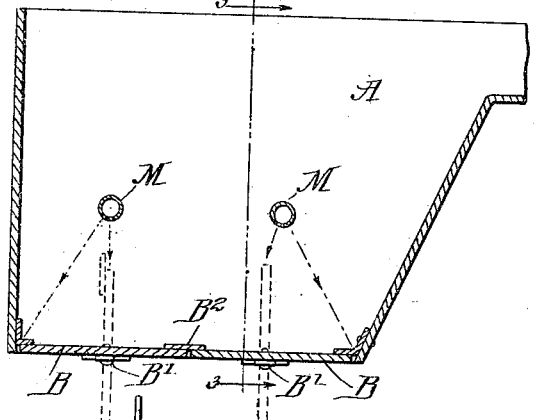
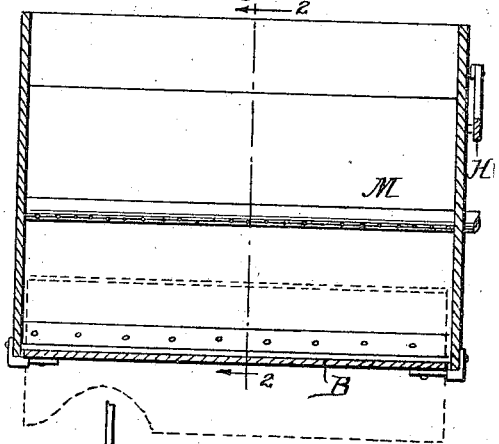
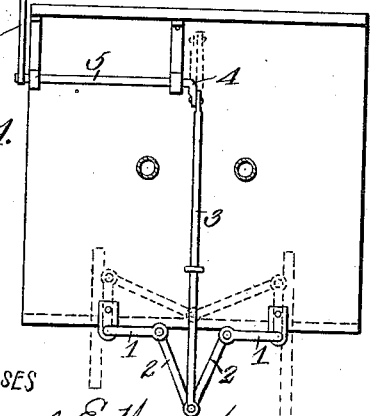
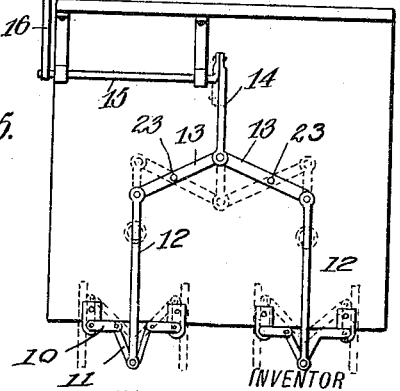
WITNESSES
INVENTOR
WILLIAM W. SYKES,
BY
ATTORNEYS

UNITED STATES PATENT OFFICE.

WILLIAM WHITE SYKES, OF MANCHESTER, VIRGINIA, ASSIGNOR OF ONE-THIRD TO WILLIAM H. OWENS, OF MANCHESTER, VIRGINIA, AND ONE-THIRD TO LAWRENCE CASSELMAN, OF RICHMOND, VIRGINIA.

LOCOMOTIVE ASH-PAN.

962,269.   Specification of Letters Patent.   Patented June 21, 1910.

Application filed January 17, 1910. Serial No. 538,396.

*To all whom it may concern:*

Be it known that I, WILLIAM WHITE SYKES, a citizen of the United States, and a resident of Manchester, in the county of Chesterfield and State of Virginia, have invented certain new and useful Improvements in Locomotive Ash-Pans, of which the following is a specification.

This invention is an improvement in ash-pans especially designed for locomotive use, although the invention may be embodied in ash-pans for other purposes, and the invention includes improvements in the dumping bottoms of the ash-pan and especially improvements in the means for washing off the rocking sections of the dumping bottom; and the invention consists in certain novel constructions and combinations of parts as will be hereinafter described and claimed.

In the drawing Figure 1 is a side view of a double ash-pan provided with my improvements. Fig. 2 is a longitudinal section thereof on about line 2—2 of Fig. 3. Fig. 3 is a cross section on about line 3—3 of Figs. 1 and 2 and Figs. 4 and 5 are end views illustrating the invention applied to somewhat different forms of ash-pans from that shown in Figs. 1, 2 and 3.

In Fig. 1, I illustrate the invention embodied in a double ash-pan for locomotive use, while in Figs. 4 and 5 I illustrate it for use in connection with single ash-pans and manifestly the invention may be embodied in any of the ordinary forms of ash-pans for locomotives or other use without departing from some of the principles of my invention.

In Figs. 1, 2 and 3 the rocking sections of the bottom are journaled on axes arranged at a right angle to the direction of length of the ash-pan, while in Figs. 4 and 5 the axes of the rocking sections are in the direction of length of the ashpans. Also in Figs. 4 and 5 I provide a somewhat different arrangement of operating means for rocking the bottom sections from that shown in Fig. 1.

The ash-pan A, see Fig. 1, may generally be of ordinary construction and it has its bottom provided with rocking sections in the form of plates B which are pivoted at B' so they may be rocked as indicated in dotted lines in Fig. 2 and these sections when closed as shown in full lines in Fig. 2 rest close together at their meeting edges with their outer edges underlying stops or abutments C and the inner edge of one of the sections B is provided on its upper side with an extension $B^2$ which overlaps the meeting edge of the other section. This construction is best shown in Fig. 2 and is important as it operates to cause the bottom to close and be held closed by the weight of the superimposed material. In dumping, the bottom sections may be rocked from the full line position shown in Fig. 2 to the dotted line position indicated in Figs. 1 and 2 and in doing this, I employ an operating device which I will now describe.

The sections B are provided with crank arms D whose outer ends are connected by links E with a slide rod F movable longitudinally in guides G on the pan A and connected with one arm H' of the bell crank lever H whose other arm $H^2$ is connected by a rod I with an intermediate lever J connected by a link K with a hand lever L which can be conveniently operated to rock the dumping sections of the bottom, the bottom sections of both pans shown in Fig. 1 being connected up with the intermediate lever J so the lever L may be operated to dump the sections of both pans as will be understood from Fig. 1 of the drawing.

In Figs. 4 and 5 I employ a somewhat similar operating construction to that in Fig. 4, the dumping sections therein being provided with cranks 1 connected by links 2 with a slide rod 3 whose upper end is connected with a crank arm 4 on a shaft 5 having a handle 6.

In Fig. 5 the dumping sections are arranged in two pairs and are provided with crank arms 10 connected by links 11 with rods 12 whose upper ends connect with the outer ends of levers 13 whose adjacent ends are connected by a link 14 with a crank on a shaft 15 having a handle 16, the pivots at 23 of the lever 13 being sufficiently loose to permit the operation of the levers 13 by the rod 14 as will be understood by those skilled in the art.

An important feature of my invention is the cinder extinguishing and wash-out construction which I will now describe in connection with the self-dumping pans as thereby I furnish a self-dumping and self-cleaning construction. In carrying out this feature of my invention, I provide the pans in the construction shown in Figs. 1, 2 and 3 with pipes M which extend parallel with the axis of the rocking bottom sections and are perforated with the perforations so disposed, see Fig. 2, as to discharge upon the sides of the pan and particularly upon the inner upper edges of the rocking bottom sections when the latter are opened as indicated in dotted lines in Fig. 2. By this construction the bottom sections are washed off and the ashes that may remain in the pan are washed out leaving the pan clear and clean for subsequent operations.

The pipes M may be connected with the overflow from the injector or may receive their supply of water from the tender tank or they may when desired, be coupled up with the boiler should it be desirable to discharge steam into the pan. The discharge of steam or water or steam and water mixed will be found useful in extinguishing any fire that may remain in the ashes and this operation may be carried out preliminary to dumping the ashes after which the pipes may be operated to cleanse the pan and the bottom sections as before described.

Manifestly the dampers or openings for draft can be made to suit the manufacturers of the locomotives upon which the pans may be used as some manufacturers like the draft opening at the sides, some at the front and back and others at both sides, front and back, and the bottom sections of the pan may be operated by air, steam or water pressure cylinders if desired, instead of hand power.

I claim:

1. A double ash pan having its ash-pans spaced apart and provided with rocking bottom sections, cranks on said bottom sections, slide rods, links connecting the slide rods with the cranks of their respective bottom sections, bell crank levers one for each of said pans and each of said levers having one arm connected with the slide rod of its respective pan, a pivoted lever between the said bell cranks, and rods connecting the levers with the bell cranks whereby to operate the same, substantially as set forth.

2. An ash pan having rocking bottom sections pivoted between their edges whereby they may be elevated at one edge in the open position of the sections, combined with perforated pipes arranged above said sections and extending parallel with the direction of length of the sections, the latter being so related to the perforated pipes that when the bottom sections are tilted to open position the upper edge of the said bottom sections will be moved to a point approximately below and adjacent to the perforated pipes whereby the latter will discharge to the upper edges of the sections when the latter are open, substantially as set forth.

3. The combination of spaced apart ash-pans provided with rocking bottom sections, cranks in connection with said sections, slide rods, links connecting the slide rods with the cranks of their respective bottom sections, bell crank levers, one for each of said pans and each of said levers having one arm connected with the slide rod of its respective pan, and an operating device connected with the bell crank levers.

WILLIAM WHITE SYKES.

Witnesses:
C. F. Mann,
M. C. Mann.